(12) United States Patent
Williams et al.

(10) Patent No.: US 11,636,254 B2
(45) Date of Patent: Apr. 25, 2023

(54) PROVENANCE AWARE EDITING FOR SPREADSHEETS

(71) Applicant: Microsoft Technology Licensing, LLC, Redmond, WA (US)

(72) Inventors: John Herbert Martin Williams, Cambridge (GB); Andrew Donald Gordon, Cambridge (GB); Joseph McDaid, Seattle, WA (US); Benjamin Edward Rampson, Woodinville, WA (US); Brian Jones, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 17/169,076

(22) Filed: Feb. 5, 2021

(65) Prior Publication Data
US 2022/0253597 A1 Aug. 11, 2022

(51) Int. Cl.
*G06F 40/18* (2020.01)
*G06F 16/22* (2019.01)
(Continued)

(52) U.S. Cl.
CPC .......... *G06F 40/18* (2020.01); *G06F 16/2246* (2019.01); *G06F 16/2358* (2019.01); *G06F 40/169* (2020.01)

(58) Field of Classification Search
None
See application file for complete search history.

(56) References Cited

U.S. PATENT DOCUMENTS 11,036,931 B2 * 6/2021 Pulaski .................. G06Q 10/00
11,106,861 B2 * 8/2021 Portisch .............. G06F 16/2433
(Continued)

FOREIGN PATENT DOCUMENTS

EP 0358492 A2 3/1990
EP 0455368 A2 11/1991

OTHER PUBLICATIONS

Abadi, et al., "A Core Calculus of Dependency", In Proceedings of the 26th ACM SIGPLAN-SIGACT Symposium on Principles of Programming Languages, Jan. 1, 1999, pp. 147-160.
(Continued)

*Primary Examiner* — Howard Cortes
(74) *Attorney, Agent, or Firm* — Schwegman Lundberg & Woessner, P.A.

(57) ABSTRACT

A system for provenance aware editing for propagating edits back to spreadsheets is provided. The system receives an indication of an operation to be performed at an output location. The operation indicates one or more input locations on a spreadsheet that each provides an input value. The input values are accessed and tagged with their corresponding input location on the spreadsheet. Based on the operation and the input value from each of the one or more input locations, the system derives and displays the result at the output location. A user edit to the result is received at the output location, which causes transmission of a propagation request to change the input value at one or more of the tagged input locations. Using where-provenance associated with the tagged input locations, the system propagates the user edit to one or more of the tagged input locations.

18 Claims, 8 Drawing Sheets

(51) Int. Cl.
 G06F 16/23 (2019.01)
 G06F 40/169 (2020.01)

(56) References Cited

U.S. PATENT DOCUMENTS

| | | | | |
|---|---|---|---|---|
| 2006/0048044 | A1 | 3/2006 | Genesereth | |
| 2007/0220416 | A1* | 9/2007 | Mitsui | G06F 40/18 |
| | | | | 715/212 |
| 2009/0013018 | A1 | 1/2009 | Baer et al. | |
| 2011/0252427 | A1* | 10/2011 | Olston | G06F 16/951 |
| | | | | 718/102 |
| 2011/0295854 | A1* | 12/2011 | Chiticariu | G06F 16/313 |
| | | | | 707/765 |
| 2017/0255608 | A1* | 9/2017 | Migeon | G06F 40/18 |
| 2018/0203838 | A1* | 7/2018 | Hiatt | G06F 16/2246 |
| 2019/0147031 | A1* | 5/2019 | Dvorak | G06F 40/18 |
| | | | | 715/219 |
| 2020/0349320 | A1* | 11/2020 | Owens | G06F 40/18 |

OTHER PUBLICATIONS

Acar, et al., "A Core Calculus for Provenance", In International Conference on Principles of Security and Trust, Mar. 24, 2012, pp. 410-429.

Bendre, et al., "DATASPREAD: Unifying Databases and Spreadsheets", In Proceedings of the VLDB Endowment, vol. 18, Issue 12, Aug. 2015, pp. 2000-2003.

Bendre, et al., "Towards a Holistic Integration of Spreadsheets with Databases: A Scalable Storage Engine for Presentational Data Management", In Proceedings of IEEE 34th International Conference on Data Engineering, Apr. 16, 2018, 22 Pages.

Benson, et al., "Spreadsheet Driven Web Applications", In Proceedings of the 27th Annual ACM Symposium on User Interface Software and Technology, Oct. 5, 2014, pp. 97-106.

Buneman, et al., "On Propagation of Deletions and Annotations Through Views", In Proceedings of the 21st ACM SIGMOD-SIGACT-SIGART Symposium on Principles of Database Systems, Jun. 3, 2002, pp. 150-158.

Buneman, et al., "Why and Where: A Characterization of Data Provenance", In International Conference on Database Theory, Jan. 4, 2001, 17 Pages.

Chang, et al., "Creating Interactive Web Data Applications with Spreadsheets", In Proceedings of the 27th Annual ACM Symposium on User Interface Software and Technology, Oct. 5, 2014, pp. 87-96.

Cheney, et al., "Provenance as Dependency Analysis", In International Symposium on Database Programming Languages, Sep. 23, 2007, 35 Pages.

Cheney, et al., "Provenance in Databases: Why, How, and Where", In Publication of Foundations and Trends in Databases, Apr. 2009, pp. 379-474.

Disessa, et al., "Boxer: A Reconstructible Computational Medium", In Communications of the ACM, vol. 29, Issue 9, Sep. 1, 1986, pp. 859-868.

Fehrenbach, et al., "Language-Integrated Provenance", In Proceedings of the 18th international Symposium on Principles and Practice of Declarative Programming, Sep. 5, 2016, pp. 214-227.

Foster, et al., "Combinators for Bidirectional Tree Transformations: A Linguistic Approach to the View-Update Problem", In ACM Transactions on Programming Languages and Systems, vol. 29, Issue 3, May 1, 2007, 65 Pages.

Hofmann, et al., "Edit Lenses", In Proceedings of the 39th Annual ACM SIGPLAN-SIGACT Symposium on Principles of Programming Languages, Jan. 25, 2012, pp, 495-508.

Ko, et al., "The State of the Art in End-User Software Engineering", in ACM Computing Surveys, vol. 43, Issue 3, Apr. 29, 2011, 44 Pages.

Litt, et al., "Wildcard: Spreadsheet-Driven Customization of Web Applications", In Conference Companion of the 4th International Conference on Art, Science, and Engineering of Programming, Mar. 23, 2020, pp. 126-135.

Macedo, et al., "Bidirectional Spreadsheet Formulas", In IEEE Symposium on Visual Languages and Human-Centric Computing, Jul. 28, 2014, pp. 161-168.

Meertens, Lambert, "Designing Constraint Maintainers for User Interaction", In Technical Report, Jun. 23, 1998, 79 Pages.

Murphy, et al., "FluidFramework", Retrieved from: https://github.com/microsoft/FiuidFramework/blob/6f9ada6d46ed6df17a94ef9f956171ac8ba1003d/packages/dds/merge-tree/src/mergeTree.ts, Oct. 19, 2020, 85 Pages.

Oster, et al., "Tombstone Transformation Functions for Ensuring Consistency in Collaborative Editing Systems", In International Conference on Collaborative Computing: Networking, Applications and Worksharing, Nov. 17, 2006, 10 Pages.

Pickering, et al., "Profunctor Optics: Modular Data Accessors", In the Art, Science, and Engineering of Programming, vol. 1, Issue 2, Apr. 1, 2017, 51 Pages.

Reynolds, John C., "Types, Abstraction, and Parametric Polymorphism", In Information Processing, 1983, pp. 513-523.

Voigtlander, Janis, "Bidirectionalization for Free! (Pearl)", In ACM SIGPLAN Notices, vol. 44, Issue 1, Jan. 18, 2009, pp. 165-176.

Wadler, Philip, "Theorems for Free!", In Proceedings of the 4th International Conference on Functional Programming Languages and Computer Architecture, Nov. 1, 1989, pp. 347-359.

Williams, et al., "Higher-Order Spreadsheets with Spilled Arrays", In Proceedings of European Symposium on Programming, Apr. 27, 2020, pp. 743-769.

Tan, Wang-Chiew, "Containment of Relational Queries with Annotation Propagation", In International Workshop on Database Programming Languages, Sep. 6, 2003, 16 Pages.

Allen, Lynn, "Bi-Directional Linking with Exceland AutoCAD", Retrieved from: https://www.youtube.com/watch?v=5kjTqxXPrSM, Apr. 3, 2013, 4 Pages.

Fehrenbach, Stefan, "Language-Integrated Provenance", In Thesis of University of Edinburgh, 2019, 198 Pages.

Foster, et al., "Three Complementary Approaches to Bidirectional Programming", In Generic and Indexed Programming, 2012, 46 Pages.

Mayer, et al., "Bidirectional Evaluation with Direct Manipulation", In Proceedings of the ACM on Programming Languages, Nov. 2018, 29 Pages.

"International Search Report and Written Opinion Issued in PCT Application No. PCT/US22/013032", dated May 6, 2022, 12 Pages.

Williams, et al., "Where-Provenance for Bidirectional Editing in Spreadsheets", In Proceedings of IEEE Symposium on Visual Languages and Human-Centric Computing (VL/HCC), Oct. 10, 2021, 10 Pages.

* cited by examiner

PROVENANCE AWARE EDITING FOR SPREADSHEETS

TECHNICAL FIELD

The subject matter disclosed herein generally relates to special-purpose machines that facilitate editing of spreadsheets, and to the technologies by which such special-purpose machines become improved compared to other machines that edit spreadsheets. Specifically, the present disclosure addresses systems and methods that utilizes where-provenance for propagating edits back to spreadsheets.

BACKGROUND

In spreadsheet applications, formulas compute outputs using values obtained from one or more input cell locations. Typically, the outputs cannot be edited because they are computed by the formula. In complex systems that do allow edits to the output, bidirectional evaluation or transformation is required in order to edit a value in an input cell location based on the edit to the output. These bidirectional evaluations or transformations require complex analysis of the program (or component consumer of inputs) to be able to propagate edits back to the input cell location. In particular, existing systems analyze the formula used to generate the output and look at the different components to figure out how to reverse or do a bidirectional transformation of each bit of the formula by understanding the operation.

BRIEF DESCRIPTION OF DRAWINGS

Various ones of the appended drawings merely illustrate example embodiments of the present invention and cannot be considered as limiting its scope.

DETAILED DESCRIPTION

Figure 1A:
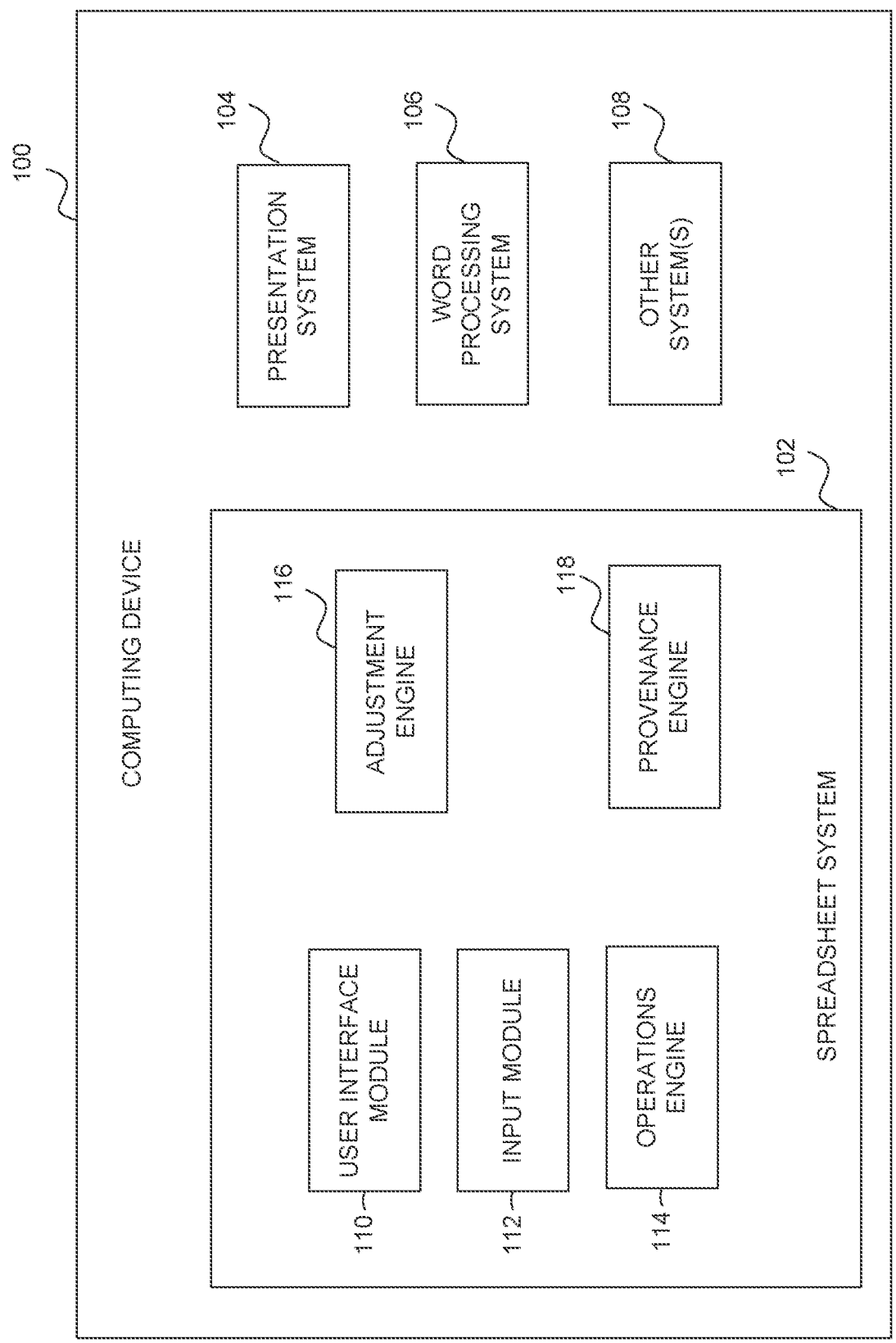
FIG. 1A is a diagram illustrating a computing device suitable for providing provenance aware editing for updating spreadsheets, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments are directed to a system and method that provides provenance aware editing for propagating edits back to spreadsheets. Spreadsheets are a combination of input values that are directly embedded in cells (also referred to herein as "input locations") and components that consume values (e.g., performs an operation) to produce an output, such as output values or charts. When a component produces an output that contains an exact copy of an input value, a component context, such as a cell location or plot, can be used to edit the input value directly. Specially, bidirectionality is added to the output such that editing the output can directly affect the input. The bidirectionality is enabled by tagging values used in performing the operations with where-provenance (also referred to as "provenance" for simplicity) that indicates its location in the spreadsheet. Thus, each tagged output defines a bidirectional transformation such that when the tagged output is a result of an operation in an output cell or location, that output location inherits the capability to edit the input locations described by the where-provenance.

As an example, assume a spreadsheet has a cell A1 with a value 3, a cell A2 with a value 4, and a cell A3 with a value 5. In cell B1, an operation (e.g., formula) is entered: MAX(A1:A3). The operation in cell B1 evaluates to 5 which is an exact copy of the value in A3. If cell B1 is edited with the user entering a value 6, then the edit is propagated back, based on where-provenance, to cell A3 resulting in A3 being updated with a value 6. Further illustrative examples are presented below.

One challenge with propagating an edit back to the input location is that the input location can change. Thus, the location recorded in the provenance of a tagged output value must change when the corresponding input location is changed, for example, via a row or column insertion or deletion. For example, an edit can be made to the spreadsheet that adds or removes a cell, a row, or a column. This edit to the spreadsheet can cause the original input location to be shifted in the spreadsheet. As such, mechanisms are provided to implement demand driven and incremental position adjustment. In one embodiment, the mechanism includes a new data structure referred to as an adjust tree, which will be discussed in more detail below.

Thus, the present disclosure provides technical solutions for updating values in a spreadsheet based on edits to an output derived from the values in the spreadsheet. More specifically, example embodiments provide mechanism that enable, when an operation produces an exact copy of a value or values from the spreadsheet, updates to the values in the spreadsheet based on a change to the output of the operation using where-provenance. As a result, one or more of the methodologies described herein facilitate solving technical problems associated with updating values in spreadsheets and more specifically, updating values in spreadsheets based on edits to outputs derived from the values in the spreadsheet. These technical solutions simplify more complex conventional solutions that perform bidirectional evaluation and transformation. As such, the technical solutions reduce computations required to be performed in the complex solutions. When these effects are considered in aggregate, one or more of the methodologies described herein may obviate a need for certain efforts or resources that otherwise would be involved in the complex solutions. Computing resources used by one or more machines, databases, or devices (e.g., within the network environment 100) may be reduced. Examples of such computing resources include processor cycles, network traffic, memory usage, data storage capacity, power consumption, and cooling capacity.

FIG. 1 is a block diagram illustrating a computing device 100 suitable for providing provenance aware editing for updating spreadsheets, according to some example embodiments. The computing device 100 comprises a plurality of systems that may, in some embodiments, communicate with each other to provide where-provenance editing of spreadsheets. Accordingly, the computing device 100 includes a spreadsheet system 102 that host, manages, and presents spreadsheets that are used in the where-provenance embodiments discussed herein. The computing device 100 may also include further system in which output of operations using values from input locations (e.g., cells) of the spreadsheet are presented. These further systems can include a presentation system 104, a word processing system 106, and other system(s) 108 that can present an output of an operation performed using values from a spreadsheet managed by the spreadsheet system 102. For example, the presentation system 104 may incorporate an output derived from one or more input values accessed from a spreadsheet managed by the spreadsheet system 102 in a presentation generated by the presentation application 104. Similarly, the word processing system 106 may include an output derived from one or more input values accessed from the spreadsheet managed by the spreadsheet system 102 in a document generated by the word processing system 104. The output may be presented in, for example, a chart, graph, cell, text, or any other format enabled by the corresponding system 102-108. In one embodiment, one or more of the systems 102-108 may be implemented as hardware. Alternatively, one or more of the systems 102-108 may be implemented as a software application.

In some embodiments, the systems 102-108 can be external to the computing device 100 but communicatively couple thereto. For example, the further systems 104-108 can be coupled via a communication network to the computing device 100. Alternatively, the spreadsheet system 102 or spreadsheet from which values are accessed may be located external to the computing device 100 and be accessed via the communication network by the various systems 104, 106, or 108 of the computing device 100 to obtain values and/or propagate edits back to update the corresponding spreadsheet. One or more portions of the communication network may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the communication network may communicate information via a transmission or signal medium. As used herein, "transmission medium" refers to any intangible (e.g., transitory) medium that is capable of communicating (e.g., transmitting) data, and includes digital or analog communication signals or other intangible media to facilitate communication of such software.

To enable where-provenance, the spreadsheet system 102 comprises a user interface module 110, an input module 112, an operations engine 114, an adjustment engine 116, and a provenance engine 118 all coupled to communicatively communicate with each other. The spreadsheet system 102 may comprise other components that are not pertinent to the description of example embodiments and are, therefore, not shown.

The user interface module 110 is configured to present user interfaces on a display associated with the computing device 100. The user interfaces can include presentation of a spreadsheet or a workbook comprising multiple spreadsheets. Each spreadsheet comprises a plurality of cells, whereby each cell has an associated location in the spreadsheet. In one embodiment, the location is designated by a combination of a column identifier and a row identifier. For example, the column identifier maybe a letter and the row identifier may be a number. Some of the cells of the spreadsheet may also have an input value entered therein or otherwise associated thereto. In some cases, the input value in the cells may be obtained (populated) from an external database or source (e.g., via a query on the external database or source). Additionally, the cells may contain compound data structures such as arrays or records, and locations can refer to specific values within these compound data structures. For example, if A1 has an 2×2 array {1, 2; 3, 4}, then the location "A1.(1,1)" refers to 1.

The input module 112 is configured to manage edits made to the spreadsheets. The edits can include adding, deleting, or changing values in one or more cells of the spreadsheet. Further edits can include adding a cell, a row, or a column to a spreadsheet or deleting a cell, a row, or a column from the spreadsheet. In various embodiments, the addition or deletion of a cell, a row, or a column will affect the where-provenance when propagating an edit made to a result or output back to the input location, as will be discussed further below.

In some embodiments, the input module 112 receives one or more user edits made to the result at the output location. The user edits may be directly received, as a propagation request, by the input module 112 when the user edit is made to a spreadsheet being managed by the spreadsheet system 102. Alternatively, the user edit may be received as a propagation request from one of the further systems 104-108. The propagation request triggers the provenance engine 118 to propagate the user edit to one or more input locations affected by the user edit.

The operations engine 114 performs the operation indicated by a user via a user interface provided by the spreadsheet system 102 or one of the further systems 104-108 associated with the computing device 100. Thus, the operations module 114 receives indications of operations (e.g., functions) to be performed at output locations. The indication of the operations specify one or more input locations on a spreadsheet that each provides an input value used to derive one or more output values and an operation to be performed using those input values. In some embodiments, each indication of an operation may also indicate an output location for presenting the one or more output values or result. For example, if the operation comprises a formula to find all unique value from cells A1, A2, and A3 and to show the results at cell C5, then the input module 112 receives an indication to perform an operation: C5=UNIQUE (A1, A2, A3).

In some embodiments, the indication is received via a user interface provided by the spreadsheet system 102 (e.g., via the user interface module 110). These embodiments typically result in an output location on the same spreadsheet as the input location or on a different spreadsheet managed by the spreadsheet system 102. In other embodiments, the indication is received from one of the further systems 104-108. For instance, the presentation system 104 may provide an indication of an operation to derive a result that is presented on a slide of a presentation managed (e.g., generated, presented by) the presentation system 104.

Based on the indication, the operations engine 114 accesses each input value from the indicated one or more input locations on the spreadsheet. Each accessed input value is tagged with its corresponding input location on the spreadsheet. The input location that is tagged to the input value flows through the operation (e.g., flows through a calculation or formula). The existing operators are extended to recognize tagged values and given the capability to extract the underlying (untagged) value or its provenance to use in a calculation. If the input value ends up as a result of the operation, then the output value also comprises the tagged input location. As such, the result or output value (or the output location) will "remember" both the input value and its corresponding input location. The output value(s) or result is presented (e.g., via the user interface module 110 or by one of the further systems 104-108) at the indicated output location.

The adjustment engine 116 manages determination of whether an input location has changed due to an edit performed on the spreadsheet. For example, an edit can be made to the spreadsheet that adds or removes a cell, a row, or a column. This edit to the spreadsheet can cause the original input location to be shifted to a new location. Accordingly, the adjustment engine 116 determines whether a location associated with a where-provenance propagation has changed and what the new location is. In example embodiments, the determination is only triggered in response to a request for where-provenance propagation, thus resulting in a demand driven implementation. This demand driven implementation conserves resources compared to systems that may contemplate continually updating input locations (e.g., after each change to the spreadsheet).

Where-provenance uses a cell address or input (cell) location associated with the result. Thus, a structural change to the spreadsheet will require the adjustment engine 116 to determine whether the input location has changed. In some embodiments, a time-index log of actions or a log of time-action pairs is maintained, by the adjustment engine 116. When an output value is changed, the adjustment engine 116 replays all actions (e.g., spreadsheet edits) since the output value was created to adjust the corresponding location to the current time (e.g., determine a current input location).

Accordingly, when an edit to the spreadsheet is received by the spreadsheet system 102, via the input module 112, the adjustment engine 116 generates an entry in a log maintained by the adjustment engine 116. Each entry in the log comprises a time-action pair that indicates a time that an action was performed to the spreadsheet and the action that was performed. The action can comprise one or more of adding or deleting a cell, adding or deleting a row, or adding or deleting a column.

In response to the spreadsheet system 102 receiving a propagation request to update an input value based on an edit performed to the result, the adjustment engine 116, accesses the log of time-action pairs. The log is analyzed to determine if the result being edited was derived prior to any of the times in the log. If the result was derived prior to one or more times in the log, then a determination is made whether any log entries corresponding to those one or more times involved an insertion or deletion point before the input location associated with the input value (or edited result). If the insertion or deletion point is detected before the input location, then the input location is updated accordingly.

Figure 1B:
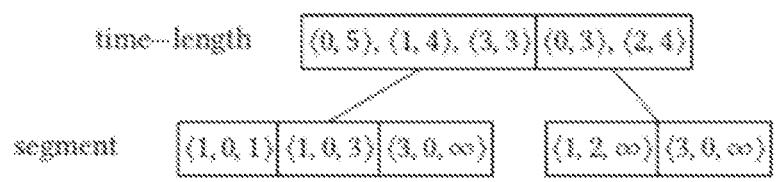
FIG. 1B-FIG. 1D illustrate an example using an adjust tree.

An alternative embodiment performed by the adjustment engine 116 uses a data structure referred to as an adjust tree. The adjust tree represents a sequence or a list of changes over time. Specifically, the adjust tree is a counted B+ tree with a salient feature that its interior nodes maintain a sequence of <time, length>tuples per child, rather than a single length. Leaf nodes are comprised of segments which are tuples of the form $<n, t_c, t_d>$, where n is the length, $t_c$ is the time the segment was inserted, and $t_d$ is the time the segment was deleted. $t_d$ is represented with a null or $\infty$ when the segment has not been deleted. The length represents the number of rows (or columns). An example adjust tree is shown in FIG. 1B.

In the example, <0,5> indicates a row was five long at time 0, and <1,4> indicates that at time 1, the row was four long. Thus, a user deleted a row of the first five rows at time 1.

Figure 1C:

Insertion of a row (or column) causes a new length to be appended to the tuple list. When an insertion or deletion position spans an existing segment, that segment is split to align the position with a segment boundary. For example, applying a time-indexed operation (1, ins(4,2)) to the segment on the left, as shown in FIG. 1C, produces the segment on the right.

Delete operations do not remove segments directly, rather delete will convert each segment in the affected range into a segment where the deleted time $t_d$ is a finite number, rather than $\infty$.

As such, if the input location was at position 7 at time 0, then the adjustment engine 116 looks for changes before position 7. Here, the adjustment engine 116 only needs to look at actions that were applied positionally. If a structural change occurs before the input location or position at a time after the result was derived, as determined from the adjust tree, then the input location is updated. Thus, the adjustment engine 116 does not need to look at all of the actions, just the ones before the provenance input location or position.

Figure 1D:
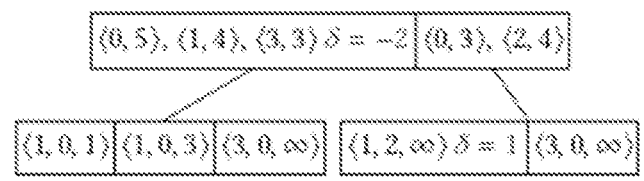

As an example, the FIG. 1D illustrates calculation of position deltas when adjusting position 6 at time 0 to the present.

Position 6 resides in a second interior node. However, a position delta is computed for the first interior node by taking the difference between its length at time 0 (5) and its current length (3). Position deltas are also computed for the segments in the second child before position 6. The segment <1, 2, ∞> is created after time 0 and the position updated accordingly. The overall delta is −2+1=−1, meaning position 6 at time 0 adjusts to position 5.

The provenance engine 118 manages propagation of an edit to the result back to one or more input locations using where-provenance. That is, the system is responsible for applying edits created by the provenance engine 118. An edit may involve changing a value (or subvalue) of an input in the spreadsheet, or when the value is included from an external source, the edit is translated into an update appropriate for that source. According to example embodiments, the where-provenance propagation is only performed for results that are a direct copy of an input value. As such, the where-provenance propagation may be applied to operations including, for example, unique, filter, sort, maximum, minimum, median, VLOOKUP, HLOOKUP, XLOOKUP, or any other conditional operation, expression, or formula (collectively referred to as an "operation"). The input value may be any type of data including a numerical value, text, or a combination thereof.

The propagation takes into consideration any shifts in the original input location. As such, the provenance engine 118 works with the adjustment engine 116 to identify the current input location. For example, the provenance engine 118 can identify the input location that will need to be updated. The identified input location is provided to the adjustment engine 116, which then determines if the identified input location has shifted. Once a current or present input location is identified or verified by the adjustment engine 116, the provenance engine 118 can cause the current input location(s) to be updated with the user edit. In some embodiments, the functions of the adjustment engine 116 and the provenance engine 118 may be combined into a single component or engine.

The propagation may change an input value at one input location or input values at multiple input locations depending on the formula or operation. For example, a UNIQUE filter can take two input values with the same number and combine the input locations. For propagation, the provenance engine 118 returns the user edit (e.g., new value) to both input locations. This may also be the case for operations such as maximum and minimum, for example. In some embodiments, the provenance engine 118 can change all or just the first input location (e.g., on a list or detected first) that satisfies the formula. For example, the provenance engine 118 can scan for a maximum and select the first input location that is detected or, alternatively, the provenance engine 118 may select all input locations with that maximum. Whether the provenance engine 118 propagates to all input locations affected by the user edit, just a first input location, or some other set of input location may be determined (e.g., set as a preference) by a user. In some embodiments, the default setting may propagate the user edit to all input locations affected by the user edit.

In some embodiments, the spreadsheet system 102 comprises a mechanism to distinguish edits at output locations that should propagate back to the input location using the provenance engine 118 versus editing the formula directly. For example, a formula in A2 may be "=A1" and a user inputs "10" into A2. This could either send the user edit back and update A1 to 10, or it can change the formula in A2 to 10. Mechanisms used to distinguish these cases can include having a toggle associated with the cell, having two input forms for the cell (e.g., one for editing the formula like a formula bar and one for sending edits back to the input like an in-grid editor), or having a spreadsheet function that enables the capability such as, for example, =UPDATABLE (A1).

In example embodiments, any of the systems, modules, or engines (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or components illustrated in FIG. 1 may be combined into a single system or device. Additionally, some of the components of the spreadsheet system 102 may be located or performed at the presentation system 104, word processing system 106, other systems 108, or other components of the computing device 100 that are not shown in FIG. 1. Furthermore, the functions described herein for any single system or component may be subdivided among multiple systems or components. Further still, some components or functions of the computing device 100 may be combined or located elsewhere in a network environment and coupled to the computing device 100.

Figure 2:
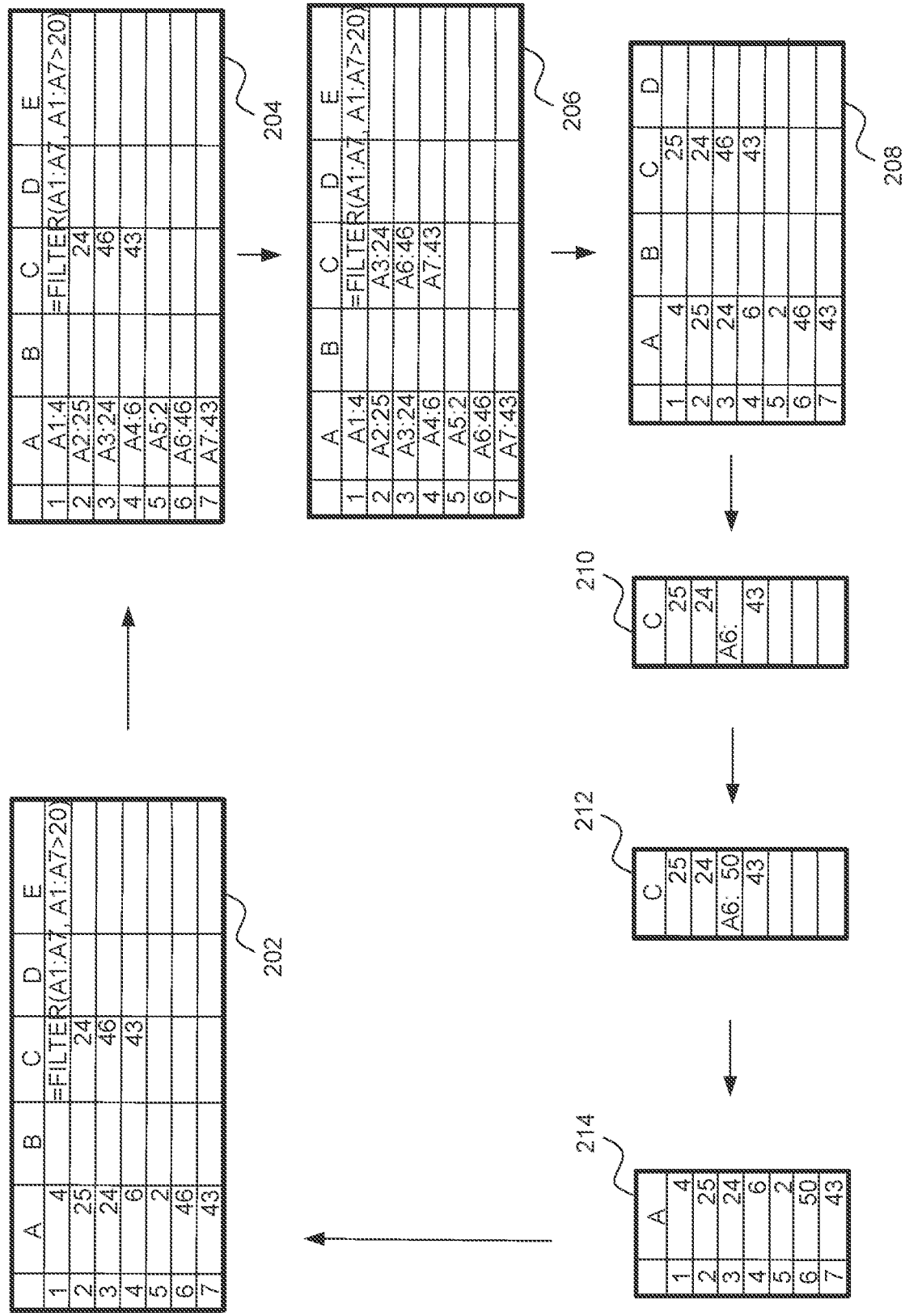
FIG. 2 is an example illustrating provenance aware editing for updating a spreadsheet, according to one example embodiment.

FIG. 2 is an example illustrating provenance aware editing for updating a spreadsheet, according to one example embodiment. In a portion of a first iteration 202 of the spreadsheet, values are shown in a column labelled A. Additionally, an operation (e.g., a formula) is entered in cell C1. Based on the entered operation, calculations begin. As shown in a second iteration 204, initial values are read from the spreadsheet and annotated with their location or where-provenance. While location annotations are shown in column A in the second iteration 204, the location annotations are not visible to the user.

Moving to a third iteration 206, the filter operation is performed. The filter calculates normally, and annotated values appear in the results and spill out. The results being derived have where-provenance as shown in the third iteration 206. The where-provenance may or may not be shown to the user as the operation is being performed.

The filter operation finishes and the fourth iteration 208 is displayed. Here, the spreadsheet displays the calculated results in column C. The calculated values in C1:C4 have where-provenance, but the user may only see the underlying value (e.g., where-provenance or input location is not shown to the user).

The user edits an output of the result in the fifth iteration 210. As shown, the user enters cell C3 that contains a calculated value with where-provenance. In the present example, the where-provenance is displayed to the user when the user enters the cell. Here, the where-provenance or input location is A6. Alternative embodiments may not present the where-provenance.

The user enters (e.g., types) and commits an edit as shown in the sixth iteration 212. Here, the user enters "50" into cell C3. The where-provenance directs a cell update event "set as 50" (also referred to as a "propagation request") to the location described by the where-provenance—cell A6. The user edit is applied to the location in the seventh iteration 214. As shown, cell A6 has been updated to a value of 50.

Figure 3:
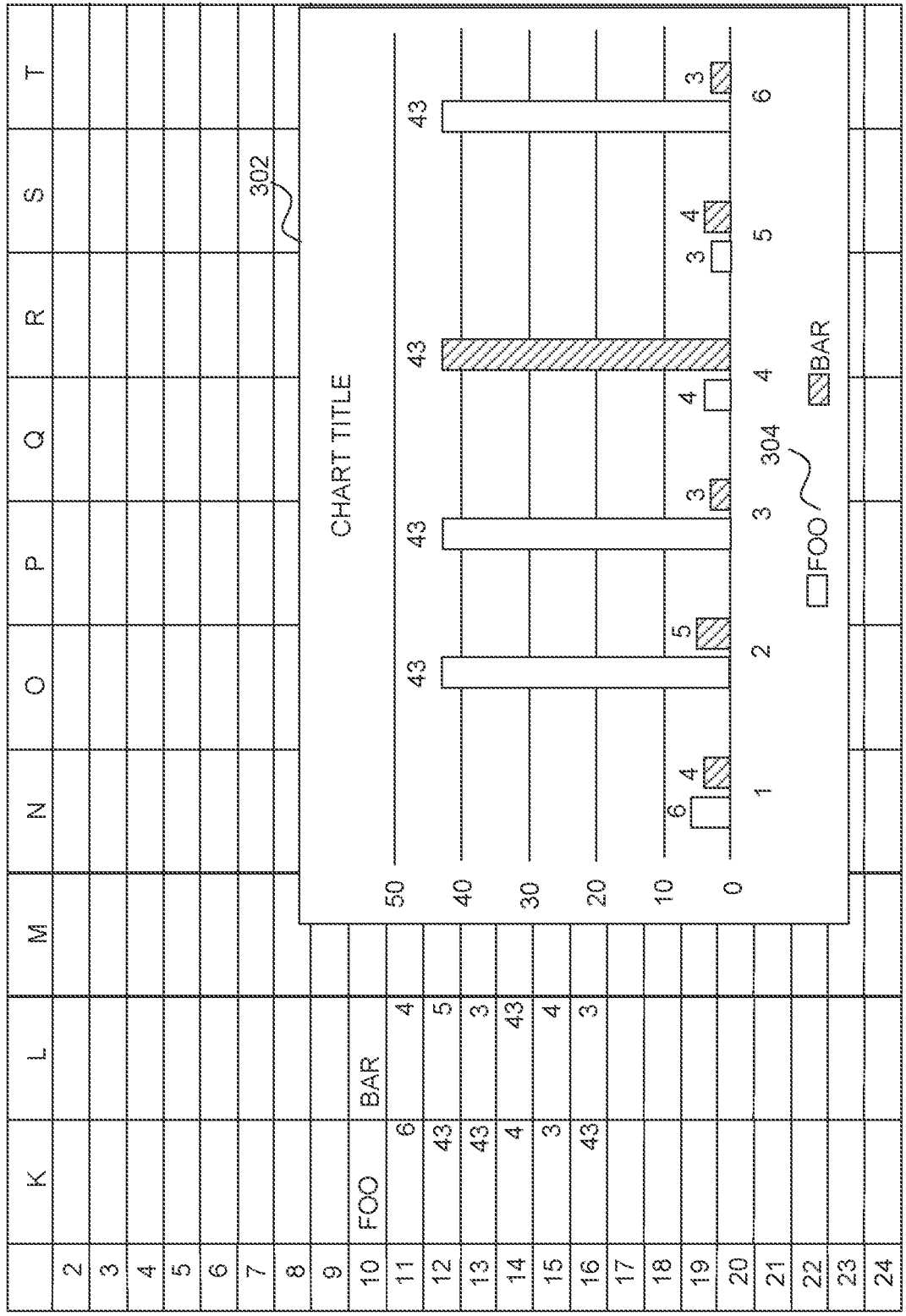
FIG. 3 is another example illustrating provenance aware editing for updating a spreadsheet, according to another example embodiment.

FIG. 3 is another example illustrating provenance aware editing for updating a spreadsheet, according to another example embodiment. In this example, text may be propagated back to a spreadsheet. Here, a chart 302 is generated from values in the spreadsheet. The chart 302 displays two series, Foo and Bar. A legend 304 is taken by directly referencing cells K10 (for Foo) and L10 (for Bar). The legend 304 comprises values that are an exact copy. Therefore, if the user edits, for example, Foo in the chart 302, the user edit is propagated back and modifies cell K10. Further still, the user can edit a numerical value or graphical element (e.g., shorten or lengthen a bar in the chart), and the edit can be propagated back to a corresponding input location to change the input value (e.g., numerical value, text, array).

Figure 4:
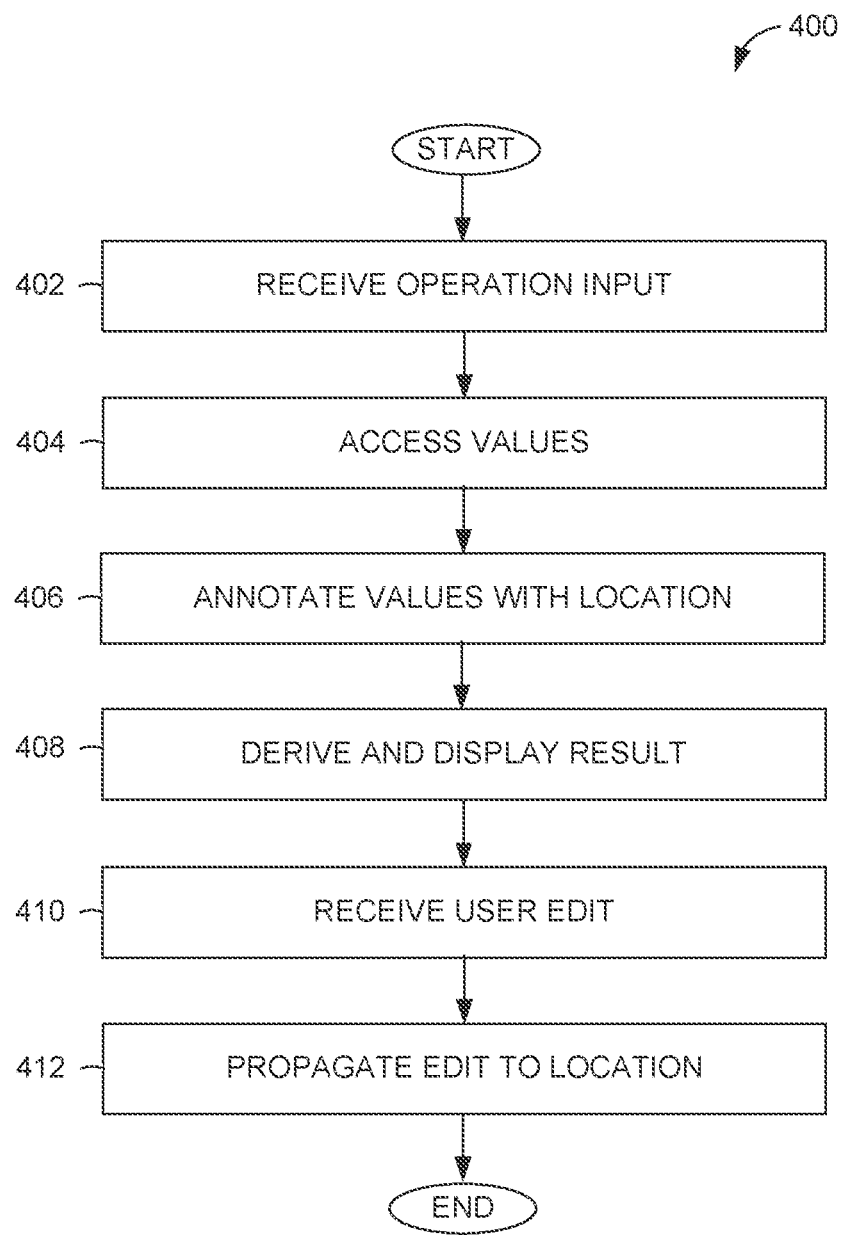
FIG. 4 is a flowchart illustrating operations of a method for providing provenance aware editing for updating a spreadsheet, according to some example embodiments.

FIG. 4 is a flowchart illustrating operations of a method 400 for providing provenance aware editing for updating a spreadsheet, according to some example embodiments. Operations in the method 400 may be performed by the spreadsheet system 102, using components described above with respect to FIG. 1. Accordingly, the method 400 is described by way of example with reference to the spreadsheet system 102. However, it shall be appreciated that at least some of the operations of the method 400 may be deployed on various other hardware configurations or be performed by similar components residing elsewhere in the computing device 100. Therefore, the method 400 is not intended to be limited to the spreadsheet system 102.

In operation 402, the input module 112 receives an operation input (or indication of an operation). In some embodiments, the operation input comprises a formula or function that is entered into a cell of a spreadsheet or other output location. The operations (or indication of the operations) each specify one or more input locations on a spreadsheet that provides an input value used to derive, via the operation (e.g., formula, function), one or more output values. In some embodiments, the indication is received via a user interface provided by the spreadsheet system 102 (e.g., via the user interface module 110). In other embodiments, the indication is received from one of the further systems 104-108. For instance, the word processing system 106 may provide the indication of an operation to derive a result that is presented on a document managed (e.g., generated, displayed by) the word processing system 106. The operation input may also include an indication of an output location where the result will be displayed.

In operation 404 input values are accessed by the operation engines 114 from the one or more input locations indicated by the operation input. For instance, if the operation comprises a formula C5=UNIQUE (A1, A2, A3), then the operation engine 114 access input values from cells A1, A2, and A3.

In operation 406, the input values are annotated with their respective input location. In example embodiments, each input value is tagged with its corresponding input location on the spreadsheet. The input location that is tagged to the input value flows through the operation (e.g., flows through a calculation). If the input value ends up as a result of the operation, then the output value may also comprise the tagged input location.

In operation 408, the operations engine 114 derives the result and causes presentation (e.g., via the user interface module 110) of the result to the user at an indicated output location. The indicated output location may comprise a location or cell where the operation was entered. In example embodiments, the output value (or the output location) will "remember" both the input value and its corresponding input location.

In operation 410, the input module 112 receives a user edit to the result at the output location. The user edits may be directly received, as a propagation request, by the input module 112, when the user edit is made to a spreadsheet being managed by the spreadsheet system 102. Alternatively, the user edit may be received as a propagation request from one of the further systems 104-108. The propagation request triggers the provenance engine 118 to propagate the user edit to one or more input locations affected by the user edit.

In operation 412, the provenance engine 118 applies the edit to the appropriate input location. The propagation takes into consideration any shifts in the original input location. As such, the provenance engine 118 works with the adjustment engine 116 to identify the current input location, as will be discussed in more detail in connection with FIG. 5 and FIG. 6 below. For example, the provenance engine 118 can identify the input location that will need to be updated based on where-provenance. The identified input location is provided to the adjustment engine 116, which then determines if the identified input location has shifted. Once a current or present input location is identified or verified by the adjustment engine 116, the provenance engine 118 causes the current input location(s) to be updated with the user edit. In some cases, the (tagged) input location is populated from an external database (e.g., by a query on the external database). In these cases, the user edit is propagated back to the external database. In other cases, the input location (e.g., cells) may contain compound data structures such as arrays or records, and locations can refer to specific values within these compound data structures. For example, if A1 has an 2×2 array {1, 2; 3, 4}, then the location "A1.(1,1)" refers to 1. In these cases, the user edit is propagated back to the proper location in the array or record.

Figure 5:
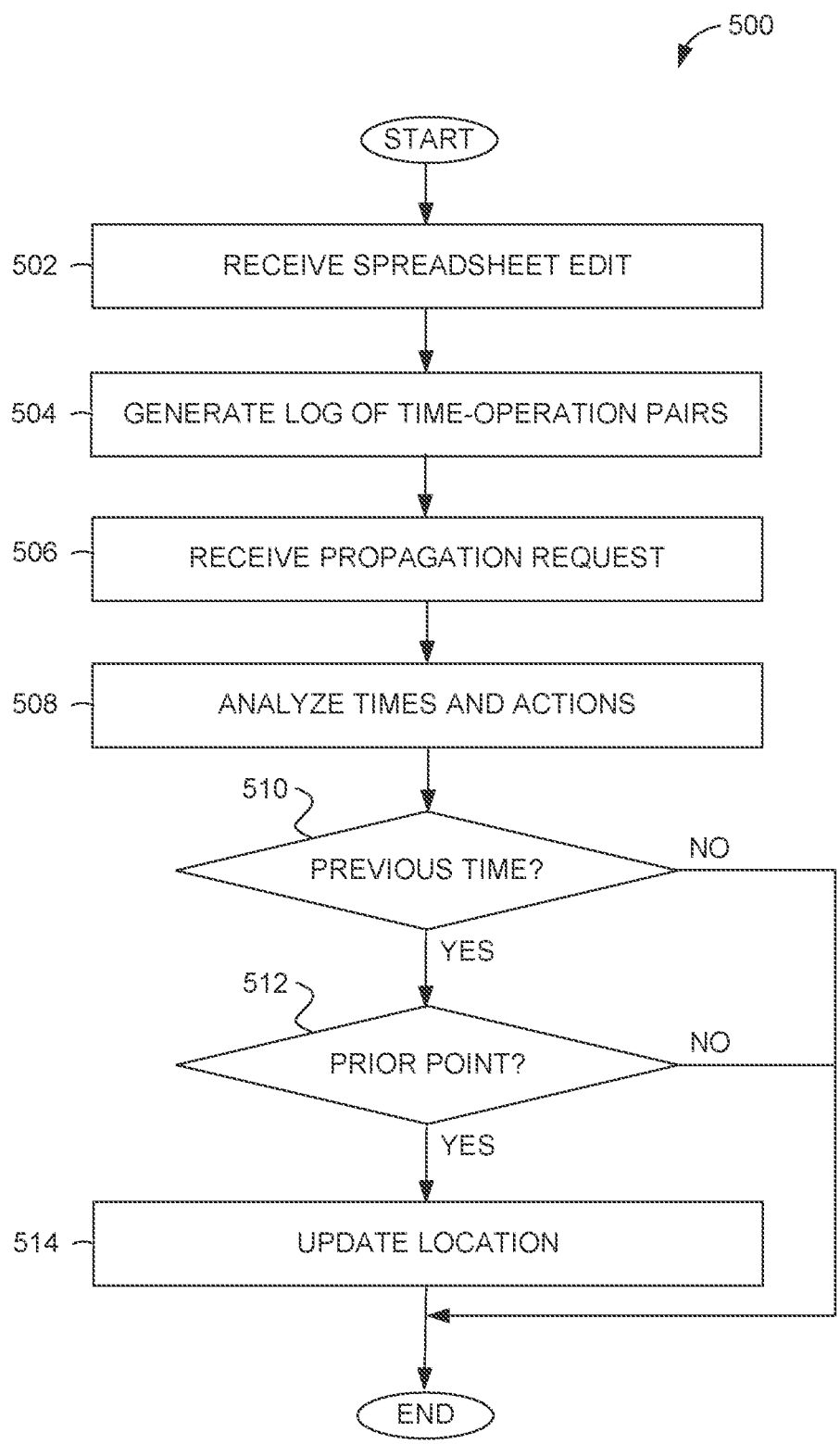
FIG. 5 is a flowchart illustrating operations of a method for updating locations involved in provenance aware editing, according to some example embodiments.

FIG. 5 is a flowchart illustrating operations of a method 500 for updating locations involved in provenance aware editing, according to some example embodiments. Operations in the method 500 may be performed by the spreadsheet system 102, using components described above with respect to FIG. 1. Accordingly, the method 500 is described by way of example with reference to the spreadsheet system 102. However, it shall be appreciated that at least some of the operations of the method 500 may be deployed on various other hardware configurations or be performed by similar components residing elsewhere in the computing device 100. Therefore, the method 500 is not intended to be limited to the spreadsheet system 102.

In various embodiments, an edit can be made to the spreadsheet that adds or removes a cell, a row, or a column. This edit to the spreadsheet can cause the original input location to shift to a new location. Accordingly, the adjustment engine 116 of the spreadsheet system 102 determines whether a location associated with where-provenance propagation has changed and what the new location is. In example embodiments, the determination is only triggered in response to a request for where-provenance propagation, thus resulting in a demand driven implementation.

In operation 502, the input module 112 receives a spreadsheet edit that adds or removes a cell, a row, or a column of the spreadsheet. In response, the spreadsheet system 102 makes the changes to the spreadsheet.

In operation 504, the spreadsheet system 102 (e.g., the adjustment engine 116) generates log of time-action pairs. In example embodiments, when the spreadsheet edit is received by the spreadsheet system 102 (e.g., via the input module 112), the adjustment engine 116 (or another component of the spreadsheet system 102) generates an entry in a log maintained by the spreadsheet system 102. The entry in the log comprises a time-action pair that indicates a time that the action (i.e., the spreadsheet edit) was performed to the spreadsheet and the action that was performed (e.g., addition or deletion of a cell, a row, or a column).

In operation 506, the spreadsheet system 102 receives a propagation request to propagate a user edit made to a result at an output location back to one or more input locations. In embodiments where the user edit is made to the same spreadsheet or workbook that the output location is located, the input module 112 may receive the user edit and generates the propagation request. In embodiments where the user edit is made to an output location external to the spreadsheet managed by the spreadsheet system 102, the input module 112 may receive the propagation request generated by the further system 104-108. The propagation request is then transmitted to the provenance engine 118 and/or the adjustment engine 116 for processing.

In operation 508, the adjustment engine 116 analyzes times and actions. In some embodiments, the adjustment engine 116 is triggered by the provenance engine 118 to perform the analysis. In other embodiments, the adjustment engine 116 is triggered by the propagation request received from the input module 112. When triggered, the adjustment engine 116 accesses the log of time-action pairs maintained at the spreadsheet system 102. The log is analyzed to determine if the result was derived prior to any of the times in the log.

In operation 510, a determination is made whether the result was derived before any times in the log. It is assumed that the spreadsheet system 102 has knowledge of when the operation occurred or has access to this knowledge. If the result was not derived prior to any time in the log, then the method 500 ends. However, if the determination indicates that the result was derived prior to one or more of the entries in the log, then the method proceeds to operation 512.

In operation 512, a determination is made by the adjustment engine 116 whether any of the actions in the one or more entries identified in operation 510 occurred to a location prior to the where-provenance input location. Thus, the adjustment engine 116 determines whether any log entries corresponding to the one or more times involve an insertion point or deletion point before the provenance input location affected by the user edit. For instance, a determination can be made whether a cell, row, or column was inserted or deleted prior to the provenance input location.

If the insertion point or deletion point is detected before the provenance input location, then the input location is updated in operation 514 by the adjustment engine 116. Based on the update to the input location, the provenance engine 118 can propagate the user edit to the result back to the updated input location and change the corresponding input value.

Figure 6:
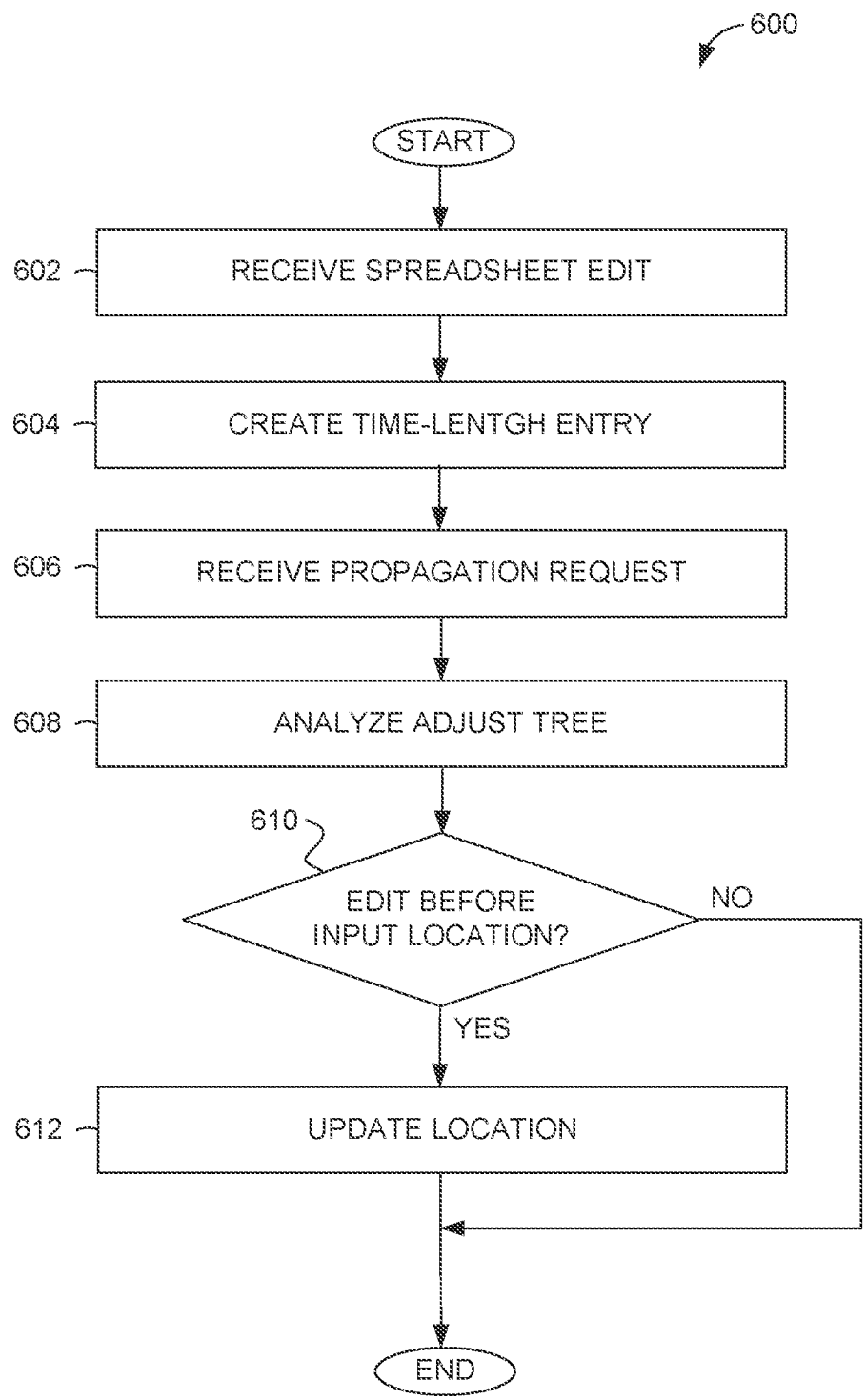
FIG. 6 is a flowchart illustrating operations of an alternative method for updating locations involved in provenance aware editing, according to some example embodiments.

FIG. 6 is a flowchart illustrating operations of an alternative method 600 for updating locations involved in provenance aware editing, according to some example embodiments. Operations in the method 600 may be performed by the spreadsheet system 102, using components described above with respect to FIG. 1. Accordingly, the method 600 is described by way of example with reference to the spreadsheet system 102. However, it shall be appreciated that at least some of the operations of the method 600 may be deployed on various other hardware configurations or be performed by similar components residing elsewhere in the computing device 100. Therefore, the method 600 is not intended to be limited to the spreadsheet system 102.

The method 600 involves an alternative embodiment performed by the adjustment engine 116 that uses adjust trees. The adjust tree is a counted B+ tree with a salient feature that its interior nodes maintain a sequence of <time, length> tuples per child, rather than a single length. Leaf nodes are comprised of segments which are tuples of the form $<n, t_c, t_d>$, where n is the length, $t_c$ is the time the segment was inserted, and $t_d$ is the time the segment was deleted. $t_d$ is represented with a null or $\infty$ when the segment has not been deleted. The length represents either the number of rows or columns. The following method 600 will be discussed with examples directed to the length representing a number of rows. However, a similar method can be used whereby the length represents a number of columns.

In operation 602, the input module 112 receives a spreadsheet edit that adds or removes a cell, a row, or a column of the spreadsheet. In response, the spreadsheet system 102 makes the changes to the spreadsheet.

In operation 604, the spreadsheet system 102 creates a time-length entry in the adjust tree. An insertion of a row causes a new length to be appended to a tuple. A deletion operation will convert each segment in the affected range into a segment where the deleted time $t_d$ is a finite number. When an insertion or deletion position spans an existing segment, that segment is split to align the position with a segment boundary as discussed in more detail above.

In operation 606, the spreadsheet system 102 receives a propagation request to propagate a user edit made to a result at an output location back to one or more provenance input locations. In embodiments where the user edit is made to the same spreadsheet or workbook that the output location is located, the input module 112 receives the user edit and generates and transmits the propagation request to the provenance engine 118. In embodiments where the user edit is made to an output location external to the spreadsheet managed by the spreadsheet system 102, the input module 112 may receive the propagation request generated by the further system 104-108 and transmits the propagation request to the provenance engine 118 and/or the adjustment engine 116.

In operation 608, the spreadsheet system 102 (e.g., the adjustment engine 116) analyzes the adjust tree. In some embodiments, the adjustment engine 116 is triggered by the provenance engine 118 to perform the analysis. In other embodiments, the adjustment engine 116 is triggered by the propagation request received from the input module 112. The analysis comprises searching for spreadsheet edits that occur prior to a provenance input location indicated in the propagation request.

In operation 610, a determination is made whether any spreadsheet edits occurred before the provenance input location. The adjustment engine 116 only needs to look at actions that were applied positionally. If no spreadsheet edits occur before the provenance input location, then the method 600 ends. If a structural change occurs before the input location or position at a time after the result was derived, as determined from the adjust tree, then the input location is updated in operation 612. Thus, the adjustment engine 116 does not need to look at all of the actions, just the ones before the provenance input location or position. The updated location is determined by determining position deltas for nodes and segments from the adjust tree and deriving an overall delta. The overall delta is then applied to the original input location to update it to the current location. Based on the update to the input location, the provenance engine 118 can propagate the user edit to the result back to the updated input location and change the corresponding input value.

An alternative approach to the position adjustments performed by the adjustment engine 116 is to replace explicit locations used by where-provenance with unique identifiers.

For instance, when an input value is read (e.g., accessed), a unique identifier is generated and stored at the input location, and the unique identifier is used as the where-provenance for the tagged value. When an update is triggered for a tagged value in the output, the spreadsheet system 102 searches the spreadsheet for the input value with the matching unique identifier from the where-provenance and updates the input value accordingly. For example:

A1=3 (Generated unique identifier: abc123)

A2=A1

The formula in A2 will evaluate to a value tagged with provenance, specifically, <abc123, 3>. When the user updates A2, the spreadsheet is searched for the input location with the unique identifier abc123 and updates that location. Here, A1 is assigned the unique identifier abc123 and updated accordingly. The unique identifiers are stored alongside the input values and therefore, move with the input values when a user inserts a row or column, thus removing the need to adjust where-provenance in output values.

While example embodiments discuss the input location being on a spreadsheet and propagating edits back to the spreadsheet, alternative embodiments can contemplate an input location being anywhere data can be stored that allows for propagation of an edit back. For example, the input location can be a table in a database.

Figure 7:
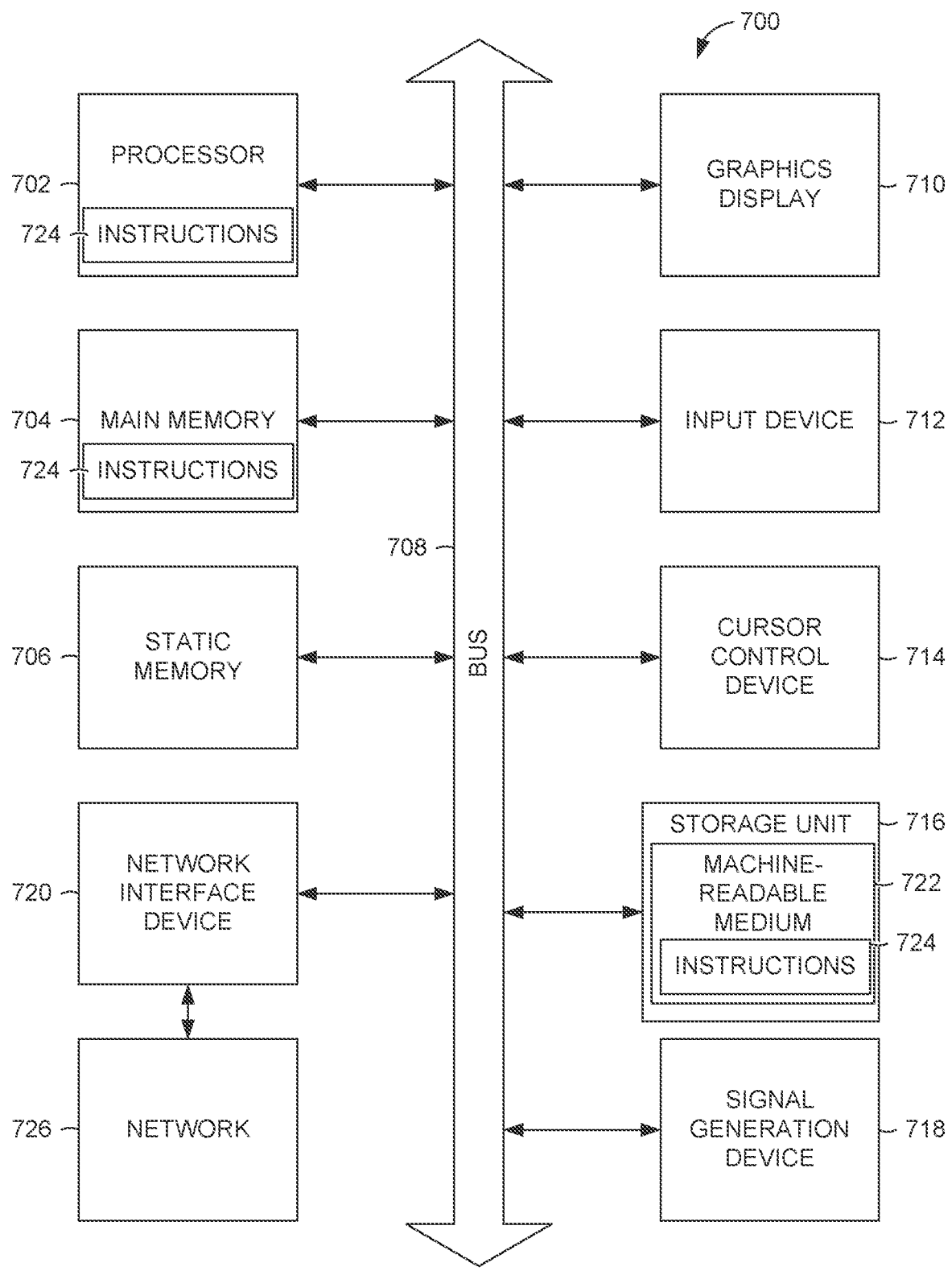
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-readable medium and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIG. 4 to FIG. 6. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 1002 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for providing provenance aware editing for propagating edits back to spreadsheets. The method comprises receiving an indication of an operation to be performed at an output location, the operation indicating one or more input locations on a spreadsheet that each provides an input value used to derive a result comprising one or more output values; accessing the input value from each of the one or more input locations on the spreadsheet, each input value used in the operation being tagged with a corresponding input location on the spreadsheet; based on the operation and the input value from each of the one or more input locations, deriving and causing display of the result at the output location; receiving a user edit to the result at the output location, the user edit causing transmission of a propagation request to change the input value at one or more of the tagged input locations; and based on the propagation request and using where-provenance associated with the tagged input locations, propagating, by at least one hardware processor, the user edit to one or more of the tagged input locations on the spreadsheet.

In example 2, the subject matter of example 1 can optionally include wherein the output location is on the spreadsheet providing the one or more input values.

In example 3, the subject matter of any of examples 1-2 can optionally include wherein the output location is on a document that is different from the spreadsheet providing the one or more input values, the document being linked to the spreadsheet via an application hosting the document.

In example 4, the subject matter of any of examples 1-3 can optionally include wherein the operation comprises one or more of a unique function, a filter function, a sort function, a maximum function, a minimum function, a median function, a VLOOKUP, a HLOOKUP, XLOOKUP, or a copy function.

In example 5, the subject matter of any of examples 1-4 can optionally include determining whether one of the one or more tagged input locations requires updating as a result of one or more edits performed to a row or column of the spreadsheet that causes the one or more tagged input locations to change to an updated input location, the determining being triggered by the propagation request.

In example 6, the subject matter of any of examples 1-5 can optionally include wherein the determining whether the location of the one or more tagged input locations require updating comprises accessing a log of recorded times and actions of the one or more edits to the row or column of the spreadsheet; performing a comparison of the times from the log to a time of the operation to determine whether at least one edit to the row or column occurred after the time of the operation; based on at least one edit occurring after the time of the operation, determining whether the at least one edit comprises an insertion or deletion point prior to a tagged input location of the one or more tagged input locations; and based on the at least one edit comprising an insertion or deletion point prior to the tagged input location, updating the location of the tagged input location.

In example 7, the subject matter of any of examples 1-6 can optionally include wherein the determining whether the one or more tagged input locations require updating comprises accessing an adjust tree comprising time-length entries, each length and corresponding time being recorded in the adjust tree based on receiving an edit to the row or column of the spreadsheet; searching the adjust tree for any edits to the spreadsheet that occur prior to a tagged input location of the one or more tagged input locations; based on at least one of the edits to the spreadsheet occurring prior to the tagged input location, determining a change in corresponding lengths; and based on the change in corresponding lengths, updating the location of the tagged input location.

In example 8, the subject matter of any of examples 1-7 can optionally include wherein the result comprises one or more numerical values; and the user edit to the result comprises a change to one of the one or more numerical values.

In example 9, the subject matter of any of examples 1-8 can optionally include wherein the result comprises text; and the user edit to the result comprises a change to the text.

In example 10, the subject matter of any of examples 1-9 can optionally include wherein based on the tagged input location being populated by a query on an external database, propagating the user edit, to the external database.

Example 11 is a system for providing provenance aware editing for propagating edits back to spreadsheets. The system includes one or more processors and a storage device storing instructions that, when executed by the one or more hardware processors, causes the one or more hardware processors to perform operations comprising receiving an indication of an operation to be performed at an output location, the operation indicating one or more input locations on a spreadsheet that each provides an input value used to derive a result comprising one or more output values; accessing the input value from each of the one or more input locations on the spreadsheet, each input value used in the operation being tagged with a corresponding input location on the spreadsheet; based on the operation and the input value from each of the one or more input locations, deriving and causing display of the result at the output location; receiving a user edit to the result at the output location, the user edit causing transmission of a propagation request to change the input value at one or more of the tagged input locations; and based on the propagation request and using where-provenance associated with the tagged input locations, propagating the user edit to one or more of the tagged input locations on the spreadsheet.

In example 12, the subject matter of example 10 can optionally include wherein the output location is on a document that is different from the spreadsheet providing the one or more input values, the document being linked to the spreadsheet via an application hosting the document.

In example 13, the subject matter of any of examples 11-12 can optionally include wherein the operations further comprises determining whether one of the one or more tagged input locations requires updating as a result of one or more edits performed to a row or column of the spreadsheet that causes the one or more tagged input locations to change to an updated input location, the determining being triggered by the propagation request.

In example 14, the subject matter of any of examples 11-13 can optionally include wherein the determining whether the location of the one or more tagged input locations require updating comprises accessing a log of recorded times and actions of the one or more edits to the row or column of the spreadsheet; performing a comparison of the times from the log to a time of the operation to determine whether at least one edit to the row or column occurred after the time of the operation; based on at least one edit occurring after the time of the operation, determining whether the at least one edit comprises an insertion or deletion point prior to a tagged input location of the one or more tagged input locations; and based on the at least one edit comprising an insertion or deletion point prior to the tagged input location, updating the location of the tagged input location.

In example 15, the subject matter of any of examples 11-14 can optionally include wherein the determining whether the one or more tagged input locations require updating comprises accessing an adjust tree comprising time-length entries, each length and corresponding time being recorded in the adjust tree based on receiving an edit to the row or column of the spreadsheet; searching the adjust tree for any edits to the spreadsheet that occur prior to a tagged input location of the one or more tagged input locations; based on at least one of the edits to the spreadsheet occurring prior to the tagged input location, determining a change in corresponding lengths; and based on the change in corresponding lengths, updating the location of the tagged input location.

In example 16, the subject matter of any of examples 11-15 can optionally include wherein the result comprises one or more numerical values; and the user edit to the result comprises a change to one of the one or more numerical values.

In example 17, the subject matter of any of examples 11-16 can optionally include wherein the result comprises text; and the user edit to the result comprises a change to the text.

Example 18 is a machine-storage medium storing instructions for providing provenance aware editing for propagating edits back to spreadsheets. The machine-storage medium configures one or more processors to perform operations comprising receiving an indication of an operation to be performed at an output location, the operation indicating one or more input locations on a spreadsheet that each provides an input value used to derive a result comprising one or more output values; accessing the input value from each of the one or more input locations on the spreadsheet, each input value used in the operation being tagged with a corresponding input location on the spreadsheet; based on the operation and the input value from each of the one or more input locations, deriving and causing display of the result at the output location; receiving a user edit to the result at the output location, the user edit causing transmission of a propagation request to change the input value at one or more of the tagged input locations; and based on the propagation request and using where-provenance associated with the tagged input locations, propagating the user edit to one or more of the tagged input locations on the spreadsheet In example 19, the subject matter of example 18 can optionally include wherein the operations further comprise determining whether one of the one or more tagged input locations requires updating as a result of one or more edits performed to a row or column of the spreadsheet that causes the one or more tagged input locations to change to an updated input location, the determining being triggered by the propagation request, wherein the determining whether the location of the one or more tagged input locations require updating comprises accessing a log of recorded times and actions of the one or more edits to the row or column of the spreadsheet; performing a comparison of the times from the log to a time of the operation to determine whether at least one edit to the row or column occurred after the time of the operation; based on at least one edit occurring after the time of the operation, determining whether the at least one edit comprises an insertion or deletion point prior to a tagged input location of the one or more tagged input locations; and based on the at least one edit comprising an insertion or deletion point prior to the tagged input location, updating the location of the tagged input location.

In example 20, the subject matter of any of examples 18-19 can optionally include wherein the operations further comprise determining whether one of the one or more tagged input locations requires updating as a result of one or more edits performed to a row or column of the spreadsheet that causes the one or more tagged input locations to change to an updated input location, the determining being triggered by the propagation request, wherein the determining whether the one or more tagged input locations require updating comprises accessing an adjust tree comprising time-length entries, each length and corresponding time being recorded in the adjust tree based on receiving an edit to the row or column of the spreadsheet; searching the adjust tree for any edits to the spreadsheet that occur prior to a tagged input location of the one or more tagged input locations; based on at least one of the edits to the spreadsheet occurring prior to the tagged input location, determining a change in corresponding lengths; and based on the change in corresponding lengths, updating the location of the tagged input location.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    receiving an indication of an operation to be performed at an output location, the operation indicating one or more input locations on a spreadsheet that each provides an input value used to derive a result comprising one or more output values;
    accessing the input value from each of the one or more input locations on the spreadsheet, each input value used in the operation being tagged with a corresponding input location on the spreadsheet;
    based on the operation and the input value from each of the one or more input locations, deriving and causing display of the result at the output location;
    receiving a user edit to the result at the output location, the user edit causing transmission of a propagation request to change the input value of at least one input location of the one or more input locations;
    in response to the propagation request, determining whether the at least one input location has shifted based on an addition or deletion of a cell, row, or column to the spreadsheet; and
    propagating, by at least one hardware processor, the user edit to a current location of the at least one input location on the spreadsheet.

2. The method of claim 1, wherein the output location is on the spreadsheet providing the one or more input values.

3. The method of claim 1, wherein the output location is on a document that is different from the spreadsheet providing the one or more input values, the document being linked to the spreadsheet via an application hosting the document.

4. The method of claim 1, wherein the operation comprises one or more of a unique function, a filter function, a sort function, a maximum function, a minimum function, a median function, a VLOOKUP, a HLOOKUP, XLOOKUP, or a copy function.

5. The method of claim 1, wherein the determining whether the at least one input location has shifted comprises:
    accessing a log of recorded times and actions of the one or more edits to the row or column of the spreadsheet;
    performing a comparison of the times from the log to a time of the operation to determine whether at least one edit to the row or column occurred after the time of the operation;
    based on at least one edit occurring after the time of the operation, determining whether the at least one edit comprises an insertion or deletion point prior to the at least one input location of the one or more input locations; and
    based on the at least one edit comprising an insertion or deletion point prior to the at least one input location, updating a location of the at least one input location to the current location.

6. The method of claim 1, wherein the determining whether the at least one input location has shifted comprises:
    accessing an adjust tree comprising time-length entries, each length and corresponding time being recorded in the adjust tree based on receiving an edit to the row or column of the spreadsheet;
    searching the adjust tree for any edits to the spreadsheet that occur prior to the at least one input location of the one or more input locations;

based on at least one of the edits to the spreadsheet occurring prior to the at least one input location, determining a change in corresponding lengths; and based on the change in corresponding lengths, updating a location of the at least one input location to the current location.

7. The method of claim 1, wherein:

the result comprises one or more numerical values; and the user edit to the result comprises a change to one of the one or more numerical values.

8. The method of claim 1, wherein:

the result comprises text; and the user edit to the result comprises a change to the text.

9. The method of claim 1, further comprising:

based on the at least one input location being populated by a query on an external database, propagating the user edit to the external database.

10. A system comprising:

one or more hardware processors; and a storage device storing instructions that, when executed by the one or more hardware processors, causes the one or more hardware processors to perform operations comprising:

receiving an indication of an operation to be performed at an output location, the operation indicating one or more input locations on a spreadsheet that each provides an input value used to derive a result comprising one or more output values;

accessing the input value from each of the one or more input locations on the spreadsheet, each input value used in the operation being tagged with a corresponding input location on the spreadsheet;

based on the operation and the input value from each of the one or more input locations, deriving and causing display of the result at the output location;

receiving a user edit to the result at the output location, the user edit causing transmission of a propagation request to change the input value of at least one input location of the one or more input locations;

in response to the propagation request, determining whether the at least one input location has shifted based on an addition or deletion of a cell, row, or column to the spreadsheet and propagating the user edit to a current location of the at least one input location on the spreadsheet.

11. The system of claim 10, wherein the output location is on a document that is different from the spreadsheet providing the one or more input values, the document being linked to the spreadsheet via an application hosting the document.

12. The system of claim 10, wherein the determining whether the at least one input location has shifted comprises:

accessing a log of recorded times and actions of the one or more edits to the row or column of the spreadsheet;

performing a comparison of the times from the log to a time of the operation to determine whether at least one edit to the row or column occurred after the time of the operation;

based on at least one edit occurring after the time of the operation, determining whether the at least one edit comprises an insertion or deletion point prior to the at least one input location of the one or more input locations; and based on the at least one edit comprising an insertion or deletion point prior to the at least one tagged input location, updating a location of the at least one input location to the current location.

13. The system of claim 10, wherein the determining whether the at least one input location has shifted comprises:

accessing an adjust tree comprising time-length entries, each length and corresponding time being recorded in the adjust tree based on receiving an edit to the row or column of the spreadsheet;

searching the adjust tree for any edits to the spreadsheet that occur prior to the at least one input location of the one or more input locations;

based on at least one of the edits to the spreadsheet occurring prior to the at least one input location, determining a change in corresponding lengths; and based on the change in corresponding lengths, updating a location of the at least one input location to the current location.

14. The system of claim 10, wherein:

the result comprises one or more numerical values; and the user edit to the result comprises a change to one of the one or more numerical values.

15. The system of claim 10, wherein:

the result comprises text; and the user edit to the result comprises a change to the text.

16. A non-transitory machine storage medium storing instructions that, when executed by one or more processors of a machine, cause the one or more processors to perform operations comprising:

receiving an indication of an operation to be performed at an output location, the operation indicating one or more input locations on a spreadsheet that each provides an input value used to derive a result comprising one or more output values;

accessing the input value from each of the one or more input locations on the spreadsheet, each input value used in the operation being tagged with a corresponding input location on the spreadsheet;

based on the operation and the input value from each of the one or more input locations, deriving and causing display of the result at the output location;

receiving a user edit to the result at the output location, the user edit causing transmission of a propagation request to change the input value of at least one input location of the one or more input locations;

in response to the propagation request, determining whether the at least one input location has shifted based on an addition or deletion of a cell, row, or column to the spreadsheet; and propagating the user edit to a current location of the at least one input location on the spreadsheet.

17. The non-transitory machine storage medium of claim 16, wherein the determining whether the at least one input location has shifted comprises:

accessing a log of recorded times and actions of the one or more edits to the row or column of the spreadsheet;

performing a comparison of the times from the log to a time of the operation to determine whether at least one edit to the row or column occurred after the time of the operation;

based on at least one edit occurring after the time of the operation, determining whether the at least one edit comprises an insertion or deletion point prior to the at least one input location of the one or more input location; and based on the at least one edit comprising an insertion or deletion point prior to the at least one input location, updating a location of the at least one input location to the current location.

18. The non-transitory machine readable storage medium of claim 16, wherein the determining whether the at least one input location has shifted comprises:
- accessing an adjust tree comprising time-length entries, each length and corresponding time being recorded in the adjust tree based on receiving an edit to the row or column of the spreadsheet;
- searching the adjust tree for any edits to the spreadsheet that occur prior to the at least one input location of the one or more tagged input locations;
- based on at least one of the edits to the spreadsheet occurring prior to the at least one input location, determining a change in corresponding lengths; and
- based on the change in corresponding lengths, updating the location of the at least one input location to the current location.

\* \* \* \* \*